United States Patent [19]

Henkel

[11] Patent Number: 4,829,766
[45] Date of Patent: May 16, 1989

[54] METHOD AND APPARATUS TO DISPOSE OF PARTICULATES SEPARATED-OFF VIA AN EXHAUST GAS FILTER OF AN INTERNAL COMBUSTION ENGINE

[75] Inventor: Dietmar Henkel, Neumarkt, Fed. Rep. of Germany

[73] Assignee: MAN Nutzfahrzeuge GmbH, Munich, Fed. Rep. of Germany

[21] Appl. No.: 69,609

[22] Filed: Jul. 2, 1987

[30] Foreign Application Priority Data

Jul. 5, 1986 [DE] Fed. Rep. of Germany ....... 3622623

[51] Int. Cl.⁴ ............................................... F01N 3/02
[52] U.S. Cl. ....................................... 60/303; 55/466; 55/523; 55/DIG. 30; 60/311
[58] Field of Search ................... 60/303, 311; 55/466, 55/523, DIG. 30

[56] References Cited

U.S. PATENT DOCUMENTS

4,283,207 8/1981 Martyniuk ........................... 60/311

Primary Examiner—Douglas Hart
Attorney, Agent, or Firm—Becker & Becker, Inc.

[57] ABSTRACT

A method and apparatus for disposing of particulate matter retained in an exhaust gas filter of an internal combustion engine, using an electric current source. For the purpose of good auxiliary energy utilization and minimization of equipment complexity, ignition and combustion of the particulates are initiated by the flow of current through the particulate matter itself (the particulates themselves serving as an electrical heating conductor). A suitable electrode configuration is provided to supply the ignition energy to the filter element. The electric input for the combustion of the particulates is applied via an impressed power supply.

9 Claims, 6 Drawing Sheets

METHOD AND APPARATUS TO DISPOSE OF PARTICULATES SEPARATED-OFF VIA AN EXHAUST GAS FILTER OF AN INTERNAL COMBUSTION ENGINE

BACKGROUND OF THE INVENTION

The present invention relates to a method of disposing of particulates, in particular carbon, removed from the exhaust gases of an internal combustion engine, especially a Diesel engine, where the exhaust gases are passed through the filter means of a particulate filter to separate-off the particulates, and the particulates retained are caused to burn with the aid of an electrical current source during operation of the engine. The invention also relates to apparatus for implementing such a method.

In addition to the presence of oxygen (in the case of Diesel engines, there is sufficient oxygen contained in the exhaust gas because such engines are operated with excess oxygen), the combustion of carbon particles to form carbon dioxide calls for temperatures such as do not generally exist in the exhaust gases at no load (idling) or part load. In order to effect ignition of the carbon particles despite this, it is known to add external energy in order to achieve the necessary ignition temperature level.

For instance, it is proposed in German Offenlegungsschrift No. 25 19 609 Hafner et al dated Nov. 11, 1976, and in German Offenlegungsschrift No. 27 56 570 -Crone dated Sept. 28, 1978, to provide ignition sources (electrically-heated glow plugs or heating coils) upstream of the filter. Since the exhaust gas heated in this manner will transmit heat not only to the particulate deposits in the filter but, in an undesirable manner, also to the filter material and all pipe walls existing downstream not to speak of the storage heat requirements of the electric heating elements -, it will be readily appreciated that the electrical auxiliary energy is used very uneconomically.

Improved utilization of the auxiliary energy is made in German Pat. No. 30 24 539 Erdmannsdorfer et al dated June 9, 1982. Here, the particulates separated-off in a non-metallic depth filter are heated as required up to the ignition temperature by the electromagnetic radiation of a microwave generator that is coupled in circuit via a wave guide. The cost involved for the microwave generator is, however, not inconsiderable.

The object of the present invention is to provide equally good auxiliary energy utilization as in German Pat. No. 30 24 539 Erdmannsdorfer et al dated June 9, 1982 using simple apparatus of relatively low cost and complexity. Furthermore, reliable and unproblematic burn-off of the particular deposits on the filter is to be achieved without affecting the filter itself or parts of the electric ignition energy supply. In this concept, the auxiliary energy is intended to be converted almost exclusively in the carbon particles retained in the filter, i.e. only the particulates themselves are heated and caused to burn through the internal heat thus produced. The residual oxygen in the exhaust gas consequently finds an already preheated carbon particle surface with which it can immediately react exothermically.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

The inventive method is characterized primarily in that the ignition of the particulates deposited on the filter means is effected with the aid of electric current flow (Joulean heat generation) through the carbon particles themselves inasmuch as these carbon particulates separated in the filter serve as an electrical conductor (heating conductor).

The underlying principle of this method of insitu particle heating (where the carbon particles themselves are turned into the site of individual heat sources which in turn heat the pertaining particle from the inside and/or their points of contact) is the electric conductivity of carbon, which presupposes the use of a filter medium consisting of electrically non-conducting material (such as structures made of ceramic or $SiO_2$). When, during operation, the carbon particles retained on the aforementioned filter means have grown together to form a minimum layer thickness such that all particles are in electric contact with each other, there exists an electric conductor of planar extent or coinciding with the surface. Using an electrode configuration providing suitable surface coverage (electrode coils, electrode grids or plates of high heat-resistance material) in the filter medium or filter structure, a current flow will be obtained, when an electric voltage is applied, which corresponds to the local distribution of the electrical resistance.

This current distribution is accompanied by a heat source distribution whose local intensity is proportional to the product of the point functions of the square of current density and specific electric resistance.

This procedure ensures almost exclusive utilization of the auxiliary energy for raising the temperature of the carbon particles; this has been confirmed by the low external energy requirements measured during the tests made.

An important advantage of this burn-off method, in addition to its low cost and complexity, is its self-regulating effect. As soon as the particulate deposits accumulated in the space between the electrodes at any point of the filter layers reach a critical value (where the conductivity gaps between the carbon particles are closed due to the conglomeration of the local "microdeposits"), burn-off is initiated fully automatically. Of course, it is necessary that the electrodes are constantly live, i.e. electrically charged. This is accompanied by homogenization of the local permeability of the filter for the exhaust gas. The reason is that only at the point where a short time ago burn-off occurred will there arise a preferred through-flow due to the consequently reduced local flow resistance (for the exhaust gas); this results in a faster rate of particulate deposition. Consequently, there is not only a homogenization of the local flow resistance, but particulate deposits can never lead to macroscopic concentration differences.

It is certainly also possible, instead of the fully-automatic burn-off cycle, to initiate burn-off as a function of the increase in pressure drop (across the separation filter). The greater amount of particulate to be burned off in this case, with its considerable positive catalytic effect, improves the auxiliary energy saving to a much greater extent insofar as inherent energy released initiates spontaneity of combustion (without a supply of electrical energy).

The apparatus to implement the inventive method, as already mentioned, is constructed in such a manner that a filter medium is used which consists of electrically non-conducting material. This non-metallic, high-temperature resistant filter medium (filter element) is placed in an appropriate metallic filter housing with inlet and outlet connections. The filter medium itself is disposed on a support plate provided with passages, with the filter element in the filter housing dividing the latter into an untreated-gas chamber and a clean-gas chamber; a specially constructed ignition energy source is used. As already explained, electrodes connected to the filter medium serve for the supply of ignition energy, the electric input being derived from a load-impressed power supply which ensures that the high ignition current that occurs to initiate ignition (due to the necessarily high ignition voltage) is limited.

Further specific features of the invention will be described in detail subsequently.

DESCRIPTION OF PREFERRED EMBODIMENTS

Referring now to the drawings in detail, a particulate filter 1 has a filter housing 2 that includes a cylindrical shell 3 and a circular disk 2a at each of its two ends. The shell 3 is supported via the disks 2a on a perforated (i.e. aperture) tubular body 4. The latter is provided at each of its two conical ends 4a with a connector 5 or 6, and is subdivided by a circular disk 7, which is provided inside, into an untreated-gas chamber 8 and a clean-gas chamber 9 (there are no perforations in the tubular body 4 in the vicinity of this circular disk). In the vicinity of the clean-gas chamber, the tubular body 4 serves as a supporting tube 4d for a filter element 11. In the embodiments illustrated in FIGS. 1–3, the filter element 11 comprises two cylindrical filter layers 12 and 13. The filter medium comprises an electrically nonconductive and high-temperature-resistant material (quartz glass or ceramic fiber), and is wound about the tubular body 4.

Figure 1:
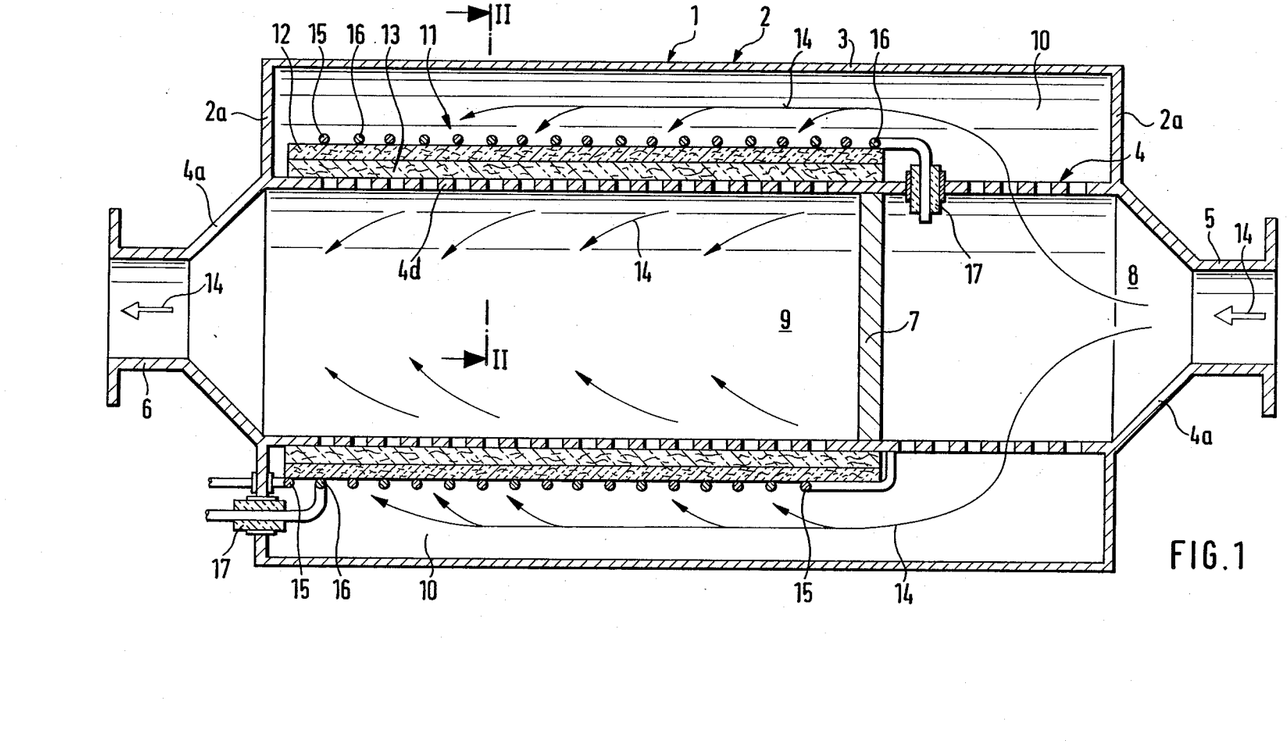
FIG. 1 is a longitudinal cross-sectional view through one exemplary embodiment of the particulate filter (surface filter) according to the present invention.

In the particulate filter described, the carbon-laden exhaust gas that flows into the untreated-gas chamber 8 through the untreated-gas inlet connector 5 is compelled or constrained by the perforations in the tubular body 4 to enter a chamber 10 that is provided between the filter housing 2 and the tubular body 4. From there, the exhaust gas flows radially through the two filter layers 12 and 13, thereupon leaving the clean-gas chamber 9 cleaned, i.e. free of carbon or particulates, via the clean-gas outlet connector 6 (see arrows 14 for the flow of the exhaust gas).

In order to ensure a high particulate separating capacity or performance, the filter wrapping 12, which provides the surface-filtering function, has to meet the following individual requirements. On the one hand, the gas-permeable pores and capillary gaps in the fabric structure must be narrow enough to be able to retain even the smallest carbon particle on the surface. On the other hand, it is desirable that a large number of the aforementioned pores and gaps should exist per unit of surface area in order to ensure a minimum of flow resistance through the fabric in addition to a desired high rate of particulate retention per unit area. Preference should also be given to a small layer thickness of the fabric because this as a rule helps to minimize the pressure drop.

In order to reliably prevent tearing of the filter wrapping 12 in the circumferential direction (in consequence of the greater temperature expansion coefficient of the perforated support tube 4), the woven fabric consisting of quartz glass or ceramic fibers of the wrapping has to meet certain requirements. For instance, where a fabric is used in which the fibers cross at right angles (orthogonal fiber matrix), it is important that the woven fabric be aligned on the surface of the tube in such a way that each of the two fiber directions forms an angle of 45° relative to the circumferential direction of the tube. This feature is based on the fact that fabric having an orthogonal fiber matrix will develop a (maximum) resilience if the direction of strain (tension or compression) is at an angle of 45° relative to the two fiber directions. However, this also means that an increase in the diameter of the metallic support tube 4 or 4d due to heating will also result in a shortening of the fabric wrapping 12 in the axial direction. However, if allowance is suitably made for this axial displacement component already when sizing the fabric wrapping, (the layer or wrapping having a greater axial length than the perforated part of the support tube), a deterioration of the filter efficiency (due to axial contraction of the fabric), which would otherwise be feared or liable to occur, is reliably obviated.

Figure 2:
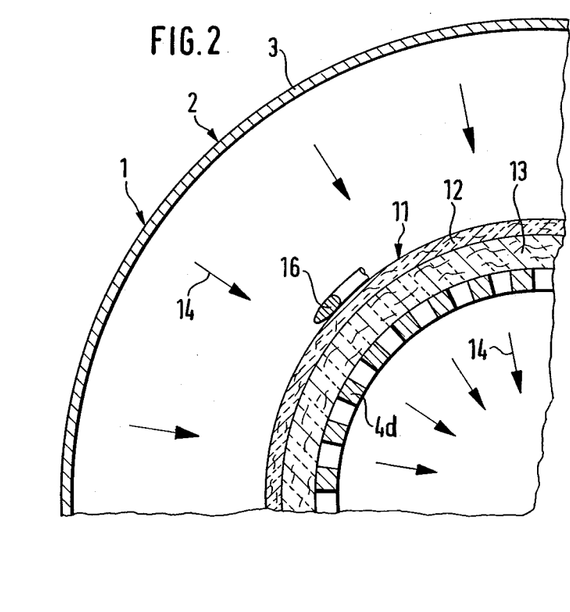
FIG. 2 is a view that shows a partial section taken along the line II—II in FIG. 1.

The particulates (carbon) deposited on the filter element 11 (filter wrapping 12) are converted into carbon dioxide by burning off such particulates (carbon). Afterburning is effected directly by heat produced by current flowing through the individual carbon particles, i.e., the carbon particles themselves are turned into heat conductors due to their finite electric conductivity. The ignition energy is supplied by two wires 15 and 16 that are spirally wound under a high tension onto the fabric wrapping to serve as electrodes. These wires cover the fabric wrapping in the form of a double-strand winding of constant pitch, with the wire winding 15 - applied to the ground potential of the current source - being connected at both ends to the sheet metal body 4 or 2a of the particulate filter 1. The winding 16, which is connected to the live potential pole of the current source, is provided at both ends with strain relief insulators 17 (inside the sheet metal body 4 or 2a of the particulate filter). To avoid the need for too high a supply voltage, the distance between the two adjacent wires is not greater than 8 mm. In order to keep heat generation in the electrode system (ohmic losses) to a minimum, the specific electric resistance of the wire material, as well as the wire diameter, have to be optimized for a given winding length in conformity with conventional practice.

With a view to preventing the formation of insulating oxide films on the wire surface, high heat-resistant nickel-alloy steels should be given preference in choosing the wire material.

For the purpose of maintaining the spacing and alignment of the electrode wires, a comparatively thick elastic filter layer 13 made of wide-mesh fabric or fleece is interposed between the fabric layer 12 and the perforated support tube 4d. This layer 13 should be selected with such a density that the volume-flow-dependent pressure drop across this supporting layer is only slight while, on the other hand, the layer possesses sufficient radial resilience. Due to the radial resilience of the wrapping 13, the electrode wires wound on under an initial stress will sink into the layer 13, while deforming the layer 12, whereby lateral displacement of the wires - which would involve the risk of a short circuit - is safely prevented.

Figure 3:
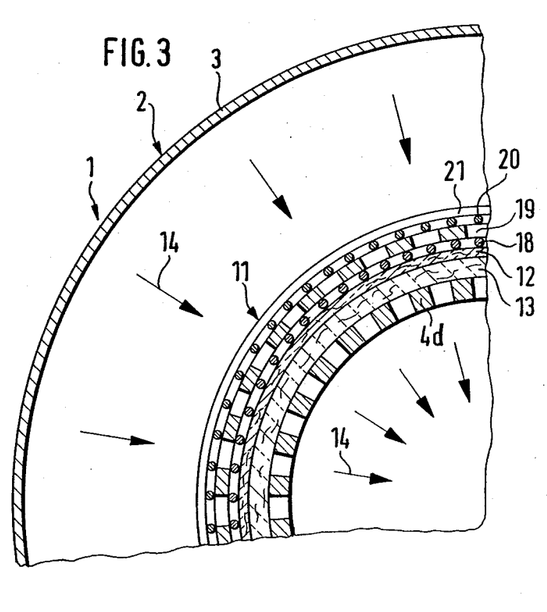
FIG. 3 is a view that shows a section as in FIG. 2 through another embodiment of the filter element and electrode system provided in the particulate filter.

An alternative configuration of the electrode system is shown in FIG. 3, where the support structure and exhaust gas flow coincide with the filter layout in FIGS. 1 and 2, with the same reference numerals being used therefor.

Disposed directly on the perforated support tube 4d is again a radially resilient layer 13 of wide-mesh, temperature-resistant fabric onto which is placed a very densely woven and again temeprature-resistance fabric structure 12, just as in the embodiment shown in FIGS. 1 and 2, to take care of the filtration function. This is followed by two layers of close-mesh steel wire fabric (mesh size 0.3 to 1 mm) 18 and 20 to serve as a pair of electrodes. An intermediate layer 19 of very wide mesh quartz glass fabric is provided to maintain the spacing and electric insulation of the electrodes (the same purpose would be served equally well by a layer of ceramic particles or a spiral winding of quartz glass roving). The necessary radial compressive force in the thus-obtained sandwich structure is provided by wire bands 21 that are disposed in the circumferential direction.

The underlying operating principle of this embodiment is briefly described in the following. The carbon particles are retained on the surface of the quartz fabric layer 12 until small carbon deposits have built up inside the meshes of the spacing fabric 19 to a layer thickness corresponding to the thickness of the spacing layer 19. At the same time, the particles provide a conductivity bridge between the electrode grids 18 and 20. If the electrodes are continuously energized electrically, start of burnup of the individual micro carbon deposits will therefore take place automatically whenever the above-mentioned conductivity bridge has just been completed.

Figure 4:
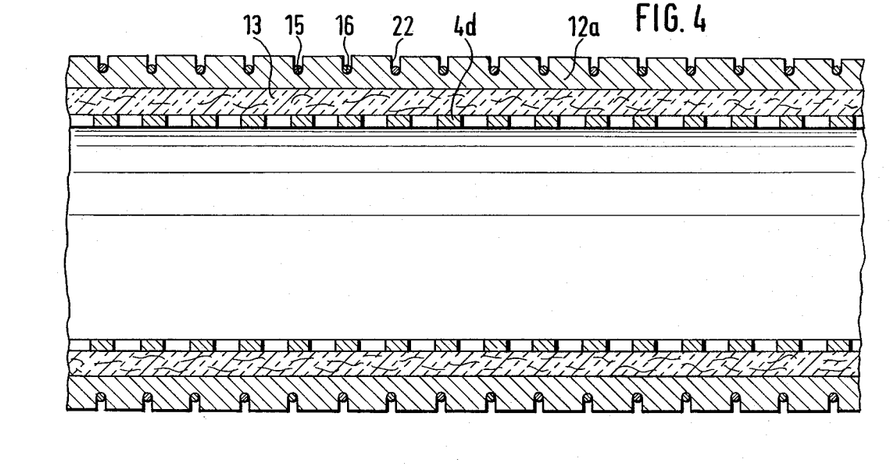
FIG. 4 is a view that shows another exemplary inventive filter element, with a modified electrode configuration.

FIG. 4 describes another embodiment of a filter element with electric ignition initiation. The underlying concept here is to a large extent identical to the solution shown in FIGS. 1 and 2. Differences exist, however, in the particulate-separating filter layer 12a, the function of which is here taken care of by a hollow cylinder made of open-pore foam ceramic. For reasons of simpler assembly, the use of two half shells (for the hollow cylinder 12a) is preferable. On the periphery of the filter layer 12a are provided insertion grooves 22 for the electrode wires 15 and 16.

Figure 5:
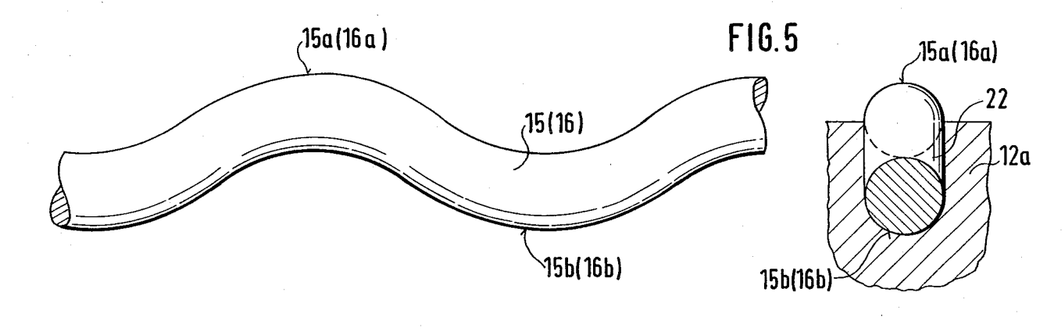
FIG. 5 is a view that shows the configuration of the wire electrodes of FIG. 4.

In order to prevent wire elongation, due to an increase in the temperature of the exhaust gas, from leading to lifting of the electrodes 15 and 16 from the base of the grooves 22 (which would interrupt contact with the carbon layer deposited!), the wire electrodes are proposed to be formed with a meander shape as shown in FIG. 5. Placed on edge and under a prestress in the groove 22, a wire formed in this manner will develop a high longitudinal flexibility, so that it will respond to temperature-dependent changes only with a corresponding change in prestress. This reliably prevents the wires from leaving the base of the groove.

Figure 6:
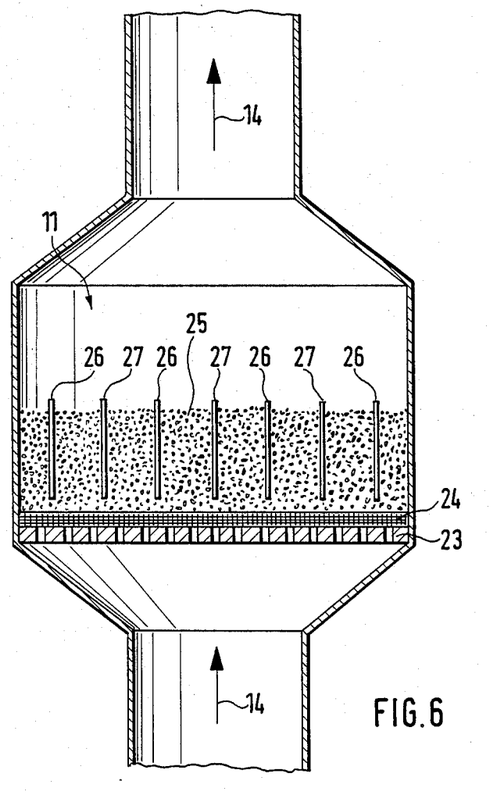
FIG. 6 is a view that shows another exemplary construction of the inventive particulate filter (bulk filter) according to the invention.

With the filter means described above, the filters are of the so-called surface type, where the particulates are deposited more or less only on the outer periphery. It is axiomatic that the afterburning of carbon initiated electrically according to the invention is also applicable to so-called depth filters, where the filter media separate or remove the particulates distinctly over a considerable radial depth. Bulk-media filters are specially suitable in this case. Here the usually fixed fabric structure is replaced by a loose medium, for instance very fine oxide ceramic granulate. The concept of such a filter is schematically shown in FIG. 6. The exhaust gases discharged from the engine (see arrow 14) first pass through a perforated support plate 23 (comparable to the reference numeral 4 or 4d in the surface filter), flow on through a granulated-retaining screen 24 provided thereabove (and made of heat-resistant wire material), and then enter the granulate fill 25.

The electrode grids or plates 26, 27 placed in the fill 25 and disposed parallel to one another with equal (as close as possible) spacing, start burnup after the electrode pairs 26, 27 have been energized. In contrast to the surface filter, the current flows through a three-dimensional conductive matrix consisting of the particulate layers which are in electrical and physical contact on each individual grain of the granulate.

A point requiring special attention in implementing the present invention is the electric ignition energy source, whose task it is to supply the conductor, which is made up of carbon particles deposited layerwise during filtration, with electric current until the carbon layer reaches the ignition temperature level. There are two characteristics of the particulates emitted by Diesel engines that call for special properties of the current source. One factor is the envelope that surrounds the carbon particle and consists of condensed hydrocarbons. The other factor is the high negative temperature coefficient of the electric resistivity of carbon. In order to initiate an electric current flow, a relatively high initial voltage is required in order to penetrate the insulating hydrocarbon envelopes. The remaining electric resistance of the carbon body, which then is only low, allows the current flow under the influence of the high voltage applied to rise to a considerable value which, due to the Joule effect and the negative temperature coefficient of electric resistivity, undergoes a further progressive increase. This means that a current source with constant impressed voltage is entirely unsuitable for an electrically initiated combustion of the particulates because the uncontrolled high current will produce a localized short-circuit arc with such high energy conversion rates that rapid destruction of the pertaining electrode and fabric structure section would result. Limiting the current by means of a suitably dimensioned series resistor might be a remedy, but its high energy losses would defeat the object of minimizing energy expenditure.

Figure 7:
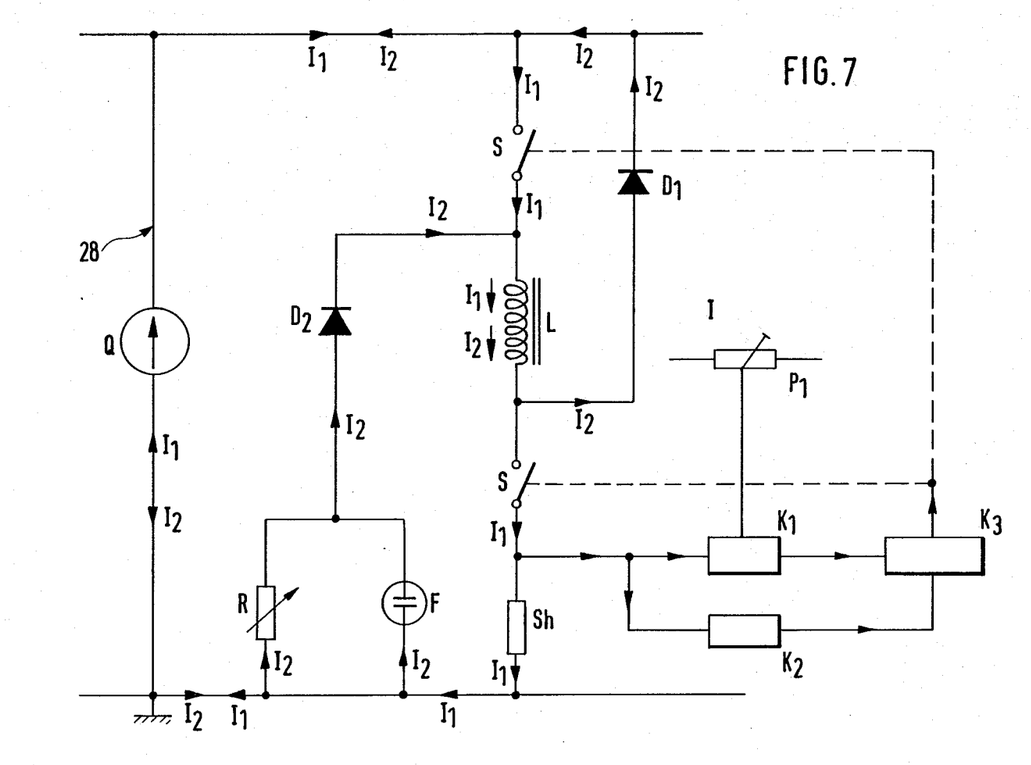
FIG. 7 is a view that shows an electric circuit diagram of a control circuit (applying the electric output) for initiating ignition for combustion of the carbon according to the invention using a load-impressed power supply.

FIG. 7 shows a circuit arrangement which, with comparatively little complexity, enables the two required features to be obtained, namely the provision of a high ignition voltage and the limiting of the subsequent heating current and Joulean heat generation. A suitably dimensioned inductivity L with a corresponding energy storage capability is applied, by means of two switching means S (transistors), to the electricity system Q of the vehicle until the charging current $I_1$, which increases with time according to an e-function, has reached the magnetic saturation level. Detection of the saturation level $I_{sat}$ is effected by means of a comparator $K_1$ which causes a bistable flip-flop $K_3$, connected in series, to make the transistors S non-conducting whenever the current-proportional voltage that drops off across a shunt Sh corresponds to the saturation level.

While the inductivity L behaves as an energy sink with storage characteristics during the period current $I_1$ flows, it changes its function at the moment the switch is opened (switch S) and becomes an energy source having an energy content according to the relationship $0.5 \, LI^2_{1sat}$. The charging current $I_1$, which is interlinked with the magnetic flux of the inductivity L, consequently becomes a discharge current (and therefore is now designated $I_2$) at the moment the switch is opened; the discharge current follows the current path: diode $D_1$ - vehicle system Q - equivalent resistance of carbon layer R - diode $D_2$. A typical feature of this discharge current is that it maintains its value (at the moment of switching), irrespective of the amount of ohmic resistance in the discharge path. For a high-ohmic resistance, which has what the carbon with its particle-bound insulating condensate envelope of liquid hydrocarbons is initially, this implies a supply voltage equal to the product of the saturation current times the momentary carbon resistance. It can be readily seen that the higher the resistance of the particulate layer, the greater than voltage supplied; the latter will always be automatically exactly equal to the sum of the penetration voltage required (all insulating layers of the particles involved in the current flow) and the voltage drop across the carbon particle proper. It can also be seen that the maximum current arising through the carbon layer is equal to the saturation current intensity $I_{sat}$ of the inductivity L.

Where required, this current load may also be reduced with the aid of a suitable adjustment at a threshold potentiometer $P_1$. If no particulates are separated on the filter, i.e. when the particulate equivalent resistance R is infinite, a voltage-triggered discharge resistor F that has a current-dependent negative resistance characteristic (inert-gas spark gap, voltage-controlled thyristor) ensures that the supply voltage is limited to a level that is lower than the air spark-over voltage between the electrodes of the ignition system.

Another benefit of the voltage-dependent discharge resistor F is the feedback of magnetic energy (into the vehicle system battery Q) insofar as it is not required for heating the particulates (such as in the aforementioned case where very little or no particulate matter is emitted by the engine).

When the discharge current $I_2$, which decreasing with time, has reached zero, a comparator $K_2$ detects and responds to reverse the subsequent bistable multivibrator or flip-flop $K_3$ into its second stable state which, in turn, produces an output signal by means of which the two switching devices S are placed in their "on" state, thereby again initiating the charging process of the inductivity L. Both processes, charging and discharging, are repeated endlessly and periodically in this manner. If f is the frequency of the developing endless cycle, then the electric power converted in the electrode system of the filter into thermal input is $P = 0.5 \, fLI^2_{1sat}$.

Energetically, the circuit showing in FIG. 7 represents a load-impressed system, in contrast with common current sources having impressed voltage (batteries, transformers, generators). It is immediately clear from this fact why, even if the resistance of the particulate layer is very low, the means load current of the switched-mode current source cannot, as desired, exceed a designed current.

A drawback of the circuit according to Figure 7 is its inability to produce high maximum or peak voltages, such as are required as ignition voltages for larger electrode spacings, e.g. in the concept illustrated by FIGS. 1 and 2. The circuit will be sufficient, however, in such cases where the maximum voltage need not be high on account of the smaller electrode spacings (see for instance the filter concept according to FIG. 3).

Figure 8:
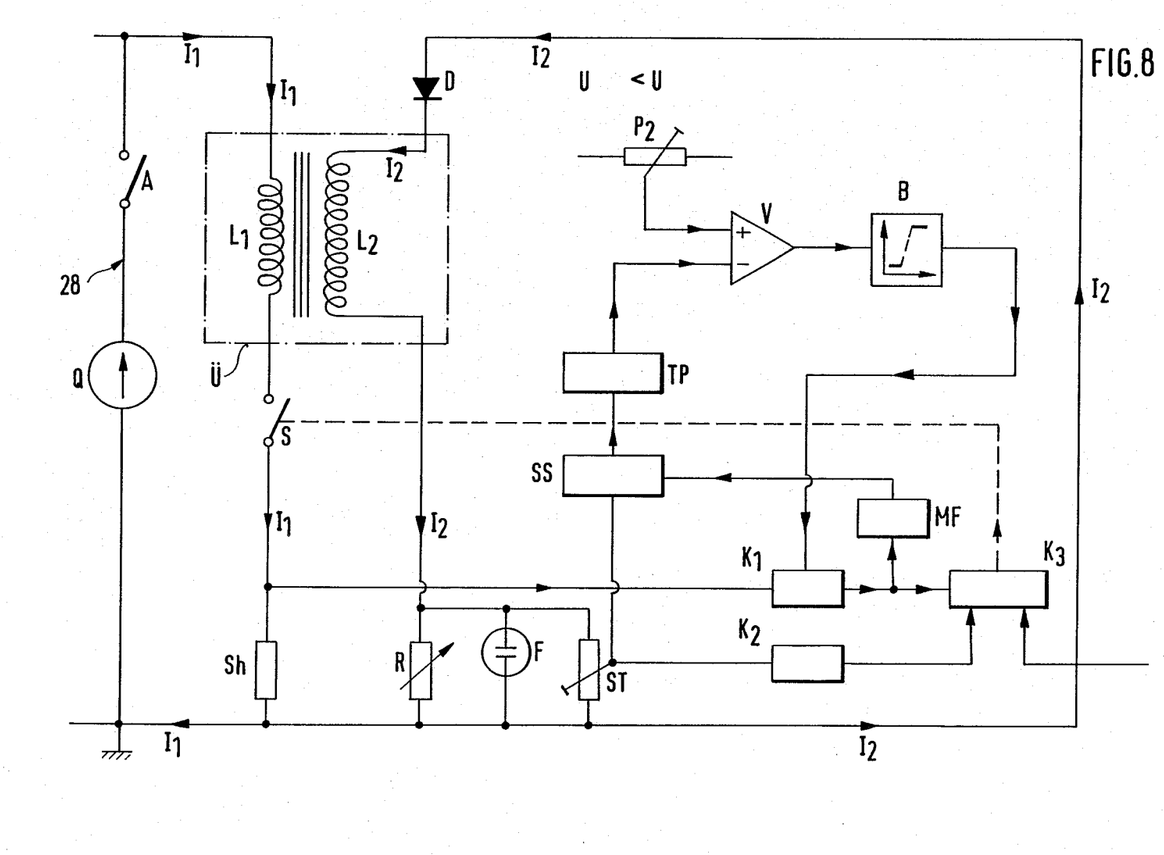
FIG. 8 is a view that shows a circuit diagram modified relative to FIG. 7 for certain electrode configurations.

In order to obtain the high maximum voltages for filter concepts where the electrodes feature wide interspaces of the live conductors, a power supply unit as shown in FIG. 8 should be used.

An important element of the switching circuit is a transformer Ü, the ratio of which (equal to the winding ratio between the secondary coil and the primary coil) is very much greater than unity. The operation is as follows:

On closing an operation switch A, the bistable flip-flop $K_3$ is briefly simultaneously activated, so that the transistor S becomes conducting. Activation of the flip-flop $K_3$, which is shown only schematically in the circuit illustrated in Figure 8, can be implemented in a manner known per se as follows: from the ignition switch on the vehicle dashboard (not shown), two auxiliary relays are energized by means of an auxiliary contact. One relay - providing the contact function A - is designed with a slight "on" delay, whereas the other relay, with its changeover contact, influences the activation input of the bistable flip-flop $K_3$ in the desired manner almost instantaneously via a debouncing logic with a subsequent monoflop. The primary current $I_1$ driven from the power source Q of the vehicle system through the primary inductivity $L_1$ produces a current-proportional voltage signal across the shunt Sh. When the value of $I_1$, which increases steadily with time, approximately reaches the saturation level, the comparator $K_1$ will respond and thereby reverse the flip-flop $K_3$ into a new stable state in which the output signal causes the transistor S to become non-conducting. The primary current $I_1$ disappears immediately. Since the magnetic flux tends to remain, the secondary current $I_2$ appears immediately, having a value that is smaller by the reciprocal of the transformer ratio than the primary current $I_1$. The current path on which flows $I_2$ is made up, according to the current flow direction (indicated by arrows as in FIG. 8), of the components: particle resistance R - diode D - inductivity $L_2$. If the voltage at the particulate resistance R rises to unacceptable values (reaching the air spark-over voltage between the electrodes), the voltage-triggered discharge resistor F imposes an automatic limitation on the transformer secondary voltage beforehand. Apart from a lower current rating, this discharge resistor also has the same properties as the discharge resistor described earlier in regard to FIG. 7 under the same reference numeral.

Connected in parallel with the particulate and discharge resistors R and F there is a voltage divider ST - providing the discharge current $I_2$ - whose output voltage is monitored by the comparator $K_2$. If the discharge current $I_2$ decreases towards zero, $K_2$ responds and reverses the bistable flip-flop $K_3$, so that the latter's output signal causes the transistor S to again become conducting for such a period as is required until the transistor S is made non-conducting again by the flip-flop in conformity with the response value of the comparator $K_1$.

With a view to minimizing the energy consumption of the circuit in line with the object of the invention, provision is made to prevent the maximum value of the impulse-shaped transformer output voltage from exceeding a presettable value.

This is realized by means of an automatically controlled setting of the threshold voltage value of the comparator $K_1$, in other words in effect by limiting the current flow period of $I_1$. The necessary control circuit for adjusting the aforementioned threshold voltage is configured as follows: the output voltage of the transformer secondary voltage obtained at the slider of the voltage divider ST is applied to a maximum value memory SS, which is subject to updating via a monoflop MF with respect to the release of its input whenever the comparator $K_1$ makes the transistor S non-conducting via the bistable flip-flop $K_3$. Supplied via a low pass filter TP to the comparator V, and compared there with the fixed setpoint for the impulse maximum voltage at the secondary inductivity $L_2$, an amplified control deviation is derived which, passing the limitor B, eventually feeds the threshold input of the comparator $K_1$.

The control deviation is subjected to two limitations in the limitor B. An upper threshold roughly corresponds to the magnetic saturation value of the charging current $I_1$ and, in the case of controller overshooting, ensures that the aforementioned value is not exceeded (protecting the transistor S). In the case of undershooting of the controller, the lower threshold of the limitor B serves to maintain stable oscillator operation of the transformer and to limit the upper level of the oscillator frequency. As far as sizing of the setpoint for the maximum permissible pulse output voltage $U_{desired}$ versus the secondary inductivity $L_2$ is concerned, it should be noted that its value should be below the threshold of the voltage-controlled protective resistor F ($U_{desired} < U_{threshold\ F}$). This is achieved by an appropriate setting at a setpoint potentiometer $P_2$.

The present invention is, of course, in no way restricted to the specific disclosure of the specification and drawings, but also encompasses any modifications within the scope of the appended claims.

What I claim is:

1. An apparatus for effecting disposal of carbon from the exhaust gases of an internal combustion engine, said apparatus comprising:
   a metallic filter housing having inlet means for untreated exhaust gas and outlet means for filtered exhaust gas;
   a filter element disposed in said filter housing to separate the latter into an untreated-gas chamber and a filtered-gas chamber, with said filter element including a support member that is provided with perforations and on which is disposed a non-metallic, high-temperature resistance filter medium for separating-off said carbon from said exhaust gases;
   a suitable electrode configuration associated with said filter element for supplying current, as ignition energy, thereto for the controlled burning of said separated-off carbon on said filter medium; said electrode configuration is connected to a source of electrical current in such a way that application of electrical power for burning said carbon is effected by a power supply unit that operates in an impressed mode in which apparatus, for the generation of an output which is independent of the load resistance or momentary equivalent particulate resistance, the current supply unit comprises a first inductivity whose periodic charging current rate is controlled by a two-position controller consisting of comparators as well as a bistable multivibrator or flip-flop in cooperation with a transistor means acting as a final control element, whereas the energy recovery required, in the base of an infinitely high equivalent particulate resistance, is made possible by means of a resistor triggered dependent on the voltage and having a negative resistance characteristic in cooperation with a diode means.

2. An apparatus according to claim 1, in which said filter medium is in the form of a surface filter of open in foamed ceramic.

3. An apparatus according to claim 1, in which a transformer having a second inductivity is used to realize higher output voltages, and in which said two-position controller controls the cut-in and cut-out of the charging current tied to said first inductivity of said transformer with a view to maintaining the output constant, one of said comparators supplying the "on" signal and the other of said comparators the "off" signal for said transistor means.

4. An apparatus according to claim 3, in which said other comparator derives the "off" signal from the discharge current of said second inductivity as it decreases to zero.

5. An apparatus according to claim 4, in which minimum loss operation is ensured by control of the threshold voltage provided by said one comparator in that the voltage drop across said equivalent particulate resistance is derived from the slider of a high-ohmic voltage element to be then applied to a switched-mode maximum-value memory for its maximum value to be maintained and on intermediate storage to be finally taken over by a smoothing low pass filter and then compared in a difference element with a setpoint voltage producing a control deviation which is to be applied by means of a limitor interactively to the threshold voltage input of said one comparator in order to form a control loop in this manner which in the case of little or not particulate deposits on the filter reduces the power losses otherwise arising in the current supply unit to an unimportant level.

6. An apparatus according to claim 5, in which updating of said maximum value memory is effected on appearance of the new output signal of said one comparator by means of a monoflop.

7. An apparatus according to claim 5, in which said setpoint voltage is to be dimensioned lower than the overvoltage threshold of said voltage triggered resistor which is reduced by means of a voltage divider.

8. An apparatus for effecting disposal of carbon from the exhaust gases of an internal combustion engine, said apparatus comprising:

a metallic filter housing having inlet means for untreated exhaust gas and outlet means for filtered exhaust gas;

a filter element disposed in said filter housing to separate the latter into an untreated-gas chamber and a filtered-gas chamber, with said filter element including a support member that is provided with perforations and on which is disposed a non-metallic, high-temperature resistant filter medium for separating-off said carbon from said exhaust gases;

a suitable electrode configuration associated with said filter element for supplying current, as ignition energy, thereto for the controlled burning of said separated-off carbon on said filter medium; said electrode configuration is connected to a source of electrical current in such a way that application of electrical power for burning said carbon is effected by a power supply unit that operates in an impressed mode;

said filter medium being in the form of a surface filter of open-pore foamed ceramic; and a carbon separating-off layer of said foamed ceramic on an elastic support wrapping; said electrode configuration including two high-heat resistant steel wires that are wound onto said foamed ceramic layer and are disposed in insertion grooves provided on the periphery of the latter.

9. An apparatus according to claim 8, in which said steel wire electrodes have a meander shape.

* * * * *